United States Patent
Heckler et al.

(10) Patent No.: US 11,112,165 B2
(45) Date of Patent: Sep. 7, 2021

(54) REFRIGERATION APPLIANCE DOOR-SEALING ARRANGEMENT

(71) Applicant: FISHER & PAYKEL APPLIANCES LIMITED, Auckland (NZ)

(72) Inventors: James Arthur Heckler, Auckland (NZ); Valentina Velichkina, Auckland (NZ)

(73) Assignee: FISHER & PAYKEL APPLIANCES LIMITED

( * ) Notice: Subject to any disclaimer, the term of this patent is extended or adjusted under 35 U.S.C. 154(b) by 0 days.

(21) Appl. No.: 16/492,549

(22) PCT Filed: Mar. 9, 2018

(86) PCT No.: PCT/NZ2018/050027
§ 371 (c)(1),
(2) Date: Sep. 9, 2019

(87) PCT Pub. No.: WO2018/164590
PCT Pub. Date: Sep. 13, 2018

(65) Prior Publication Data
US 2020/0041196 A1    Feb. 6, 2020

(30) Foreign Application Priority Data
Mar. 9, 2017   (NZ) ...................... 729916

(51) Int. Cl.
*F25D 23/08*    (2006.01)
*E05C 19/16*    (2006.01)
(Continued)

(52) U.S. Cl.
CPC .......... *F25D 23/087* (2013.01); *E05C 19/161* (2013.01); *E06B 7/2309* (2013.01); *F25D 23/028* (2013.01)

(58) Field of Classification Search
CPC .... F25D 23/087; F25D 23/028; E05C 19/161; E06B 7/2309; Y02B 40/34
See application file for complete search history.

(56) References Cited

U.S. PATENT DOCUMENTS 3,248,159 A * 4/1966 Hall ...................... E05C 19/161
                                                    312/296
3,835,660 A   9/1974 Franck
(Continued)

FOREIGN PATENT DOCUMENTS

CN        2182966 Y    11/1994
CN        1206819 A    2/1999
(Continued)

OTHER PUBLICATIONS

Supplementary European Search Report issued by the EPO dated Dec. 4, 2020.
(Continued)

*Primary Examiner* — Hanh V Tran
(74) *Attorney, Agent, or Firm* — Clark Hill PLC; James R. Foley (57) ABSTRACT

A throat assembly (14) for forming the peripheral front face of the compartment opening of a refrigeration appliance (1). The throat assembly spanning the gap between respective front edges of a refrigerator cabinet (3) outer wrapper (2) and the compartment inner liner (13). The throat assembly includes at least one elongate plastics injection moulded component having a panel (15) including a planar front face (21) for contact with a door gasket seal (16) and an elongate magnet arrangement at its rear face (22) for magnetic coupling with a door gasket magnet (20). The throat assembly may comprise plural such interconnected elongate mem-
(Continued)

bers providing a monolithic frame, formed in a single injection moulding operation, surrounding the compartment opening.

18 Claims, 4 Drawing Sheets

(51) Int. Cl.
*E06B 7/23* (2006.01)
*F25D 23/02* (2006.01)

(56) References Cited

U.S. PATENT DOCUMENTS

| | | | | |
|---|---|---|---|---|
| 4,480,407 A * | 11/1984 | Needham | | E06B 7/32 |
| | | | | 49/168 |
| 4,732,432 A | 3/1988 | Keil et al. | | |
| 4,948,208 A * | 8/1990 | Schubert | | F16C 29/00 |
| | | | | 312/334.16 |
| 5,975,661 A * | 11/1999 | Jeziorowski | | F25D 23/087 |
| | | | | 312/296 |
| 6,036,294 A | 3/2000 | Banicevic et al. | | |
| 6,190,755 B1 * | 2/2001 | Addeo | | B29C 44/12 |
| | | | | 428/156 |
| 6,464,312 B1 | 10/2002 | Tenhundfeld et al. | | |
| 9,052,135 B2 * | 6/2015 | Trulaske, Sr. | | F25D 23/087 |
| 10,612,834 B2 * | 4/2020 | Allard | | F25D 23/085 |
| 10,830,526 B2 * | 11/2020 | Gomes | | F25D 23/06 |
| 2004/0189165 A1 * | 9/2004 | An | | E05C 19/161 |
| | | | | 312/405 |
| 2007/0125002 A1 * | 6/2007 | Linkmeyer | | F25D 23/087 |
| | | | | 49/368 |
| 2008/0068974 A1 | 3/2008 | Kawano | | |
| 2009/0314028 A1 | 12/2009 | Laible | | |
| 2011/0115355 A1 * | 5/2011 | Heckler | | F25D 23/02 |
| | | | | 312/405 |
| 2012/0233873 A1 * | 9/2012 | Del Pos | | D06F 58/04 |
| | | | | 34/108 |
| 2013/0247472 A1 * | 9/2013 | Mentasti | | E05C 19/161 |
| | | | | 49/478.1 |
| 2013/0327076 A1 * | 12/2013 | Jeong | | F25C 5/22 |
| | | | | 62/321 |
| 2014/0072745 A1 * | 3/2014 | Hoffmann | | C08G 69/00 |
| | | | | 428/36.9 |
| 2015/0017366 A1 * | 1/2015 | Tranninger | | C08F 210/06 |
| | | | | 428/36.92 |
| 2015/0054396 A1 * | 2/2015 | Trulaske, Sr. | | F25D 23/087 |
| | | | | 312/405 |
| 2018/0073800 A1 * | 3/2018 | Okazaki | | F25D 23/087 |
| 2018/0164027 A1 * | 6/2018 | Lee | | F25D 11/00 |

FOREIGN PATENT DOCUMENTS

| | | | | |
|---|---|---|---|---|
| CN | 101175960 A | | 5/2008 | |
| CN | 103185445 B | | 7/2013 | |
| DE | 102005022515 A1 | | 11/2006 | |
| DE | 102009027884 A1 | | 1/2011 | |
| EP | 1462741 A2 | | 9/2004 | |
| FR | 2538517 A1 * | | 6/1984 | F25D 23/025 |
| JP | 11173749 A | | 7/1999 | |
| JP | 2003314953 A | | 11/2003 | |
| KR | 19980010981 U | | 5/1998 | |
| WO | 2012076509 A1 | | 6/2012 | |

OTHER PUBLICATIONS

Search report issued by the Chinese patent office with an examination report dated Nov. 4, 2020.

* cited by examiner

FIGURE 7

REFRIGERATION APPLIANCE DOOR-SEALING ARRANGEMENT

This application is a National Phase Filing of PCT/NZ2018/050027, having an International filing date of Mar. 9, 2018, which claims priority of New Zealand Patent Application No. 729916, filed Mar. 9, 2017. The disclosure of the foregoing is hereby incorporated by reference.

TECHNICAL FIELD

This invention relates to refrigeration appliances such as refrigerators, freezers or combined refrigerator-freezers and in particular though not solely to door sealing arrangements for such appliances.

BACKGROUND ART

Door-sealing arrangements in refrigeration appliances usually incorporate a flexible gasket seal for spanning and sealing the gap between a hinged door leaf and the cabinet shell of the appliance when the door is in a closed position. The gasket is ordinarily fixed to an inner face of the door about its periphery and is adapted to contact an adjacent flange (forming a part of the cabinet often referred to as the "throat") surrounding the opening or openings of one or more cooling compartment of the appliance. Early refrigeration appliances compressed a flexible gasket seal between the door and cabinet once the door was firmly pushed shut and mechanically latched closed. Around 50 years ago this system was replaced by a magnetic door seal arrangement in which a flexible, elongate magnet-containing gasket fixed around the periphery of the inner face of the door attracts to and forms a seal against a steel front face or flange surrounding the opening(s) of the cabinet compartment(s). Such magnetic door seal arrangements not only provide an air-tight seal to the cabinet but improve safety by maintaining a sufficient closing force on the door but which may be easily overcome by, for example, a child accidentally shut inside the appliance.

While the outer skin or "wrapper" of refrigeration appliance cabinets are conventionally formed from sheet steel (for example, stainless steel or pre-painted steel), the inner "liner" which provides the internal surfaces of the cooling compartment(s) within the appliance may be moulded or otherwise formed from a plastics material such as ABS (Acrylonitrile butadiene styrene). The volume between the liner and wrapper is filled with an insulating material such as a blown polyurethane foam which bonds to internal surfaces of both components and cures to become a rigid structural element of a cabinet sandwich construction. With this type of construction, the front face of the cabinet, which faces the inner side of the door, is often at least partially provided by a flange of the plastics inner liner. Manufacturers either arrange for the magnetic door gasket to align with a steel section of the cabinet front face (usually a flange formed by perpendicularly bending an edge strip of the adjacent cabinet wall) or, alternatively, position an amount of steel or complementary magnet behind the plastics front face, within the foamed volume, around the periphery of the cabinet opening. Such magnet will hereinafter be referred to as the throat magnet or throat magnet arrangement.

To increase resistance to heat transfer to the compartment(s) via the throat of the appliance, or when the inner liner is formed of sheet steel (for aesthetic and/or durability reasons), a thermal breaker strip may be provided about the compartment opening(s), bridging the wrapper and inner liner. The thermal breaker strip is formed of plastics or other non-magnetic material with a higher resistance to heat transfer than metal. This type of construction also requires a steel or magnetic element behind it in order to attract the door gasket magnet to the cabinet.

Some prior-art plastics thermal breaker strips were formed using a vacuum-forming process but the thickness of the flange between throat and door magnets was less than about 2 mm because conventional door-sealing magnetic arrangements could not meet required operating parameters over a larger thickness. If a thermal breaker strip is to be plastics injection moulded, which beneficially provides improved cosmetic "fit and finish", the mould cavities must have a minimum distance between opposing faces otherwise difficulties with molten plastics flow will be encountered. With the increased length of injection-moulded breaker strip components necessary for a taller cabinet, a result is that the plastics breaker strip produced from the mould has an increased thickness meaning that the door gasket and throat magnets must interact over a greater distance. Refrigeration appliance designers have minimum and maximum preferred limits on attraction force between the gasket and thermal breaker strip and must select magnets that will achieve a desirable attraction force over the breaker strip thickness. One way to ensure adequate attraction force over an increased thickness of breaker strip would be to route or mill a recessed magnet seat in the rear face of the breaker strip, in a post-forming process. However, this adds complexity, time and cost to the production process as well as the possibility of damaging the component, generating sharp edges and residual swarf remaining in the recess, and so should preferably be avoided.

Alternatively, the magnets' size or composition could be adjusted, however magnet cost increases with the strength (size and/or material) of the magnet. A magnet's strength (per unit of length) also generally increases with its cross-sectional area, for the same grade and thickness of magnet material. However, there is a constraint on the space available in the throat region of the cabinet, particularly in situations where there is also a heating tube located in the throat region to avoid "sweating" whereby moisture condenses on the visible outer surface of the thermal breaker strip. There is also a desire to maximise the available volume within refrigeration compartments which has meant that the distance between the closed door and cabinet has tended to increase in modern appliances. This increased distance is of course filled by changing the door seal's gasket profile so that it can span a greater distance although the gasket's flexibility may consequently reduce which in turn further increases the required magnetic force required to pull the gasket magnet into a closed position against the cabinet. The gasket extension force is the force required by the door gasket magnet to close the gap to the cabinet. A flexible gasket will reduce the required gasket extension force but make subsequent door opening more difficult as it will allow the door to move away from the cabinet while maintaining a seal so that cabinet internal pressure is reduced and a pressure difference results across the seal. Ideally, the gasket extension force maximises the "jump" distance of a gap that the gasket can close, without being so great that it is then difficult to subsequently open the door against the magnet seal.

Also, over time, refrigeration cabinet doors tend to sag or droop due to hinge deterioration, particularly when their shelves are or have been heavily loaded. When the door gasket seal relies upon the alignment of the gasket magnet with a steel or magnetic strip located behind a plastics front face, door-cabinet misalignment can result in a poor cabinet seal, allowing warmer ambient air to enter the refrigeration compartment(s). The trend towards larger, taller cabinets and therefore larger and heavier doors exacerbates the misalignment problem so that insufficient magnetic attraction may then be available to pull a slightly ajar door into a closed position. Attempts to overcome this misalignment problem include U.S. Pat. No. 6,464,312B where the magnet behind a plastics thermal breaker strip is given some limited freedom of lateral movement to accommodate an amount of misalignment with the door gasket magnet. Another attempt to overcome this problem is described in US20090314028A wherein a plastics thermal breaker connects a metal wrapper and metal liner and wherein, on the horizontal lengths of the front frame (which are much more susceptible to droop-induced misalignment problems) the lateral width (in use, the vertical height) of the magnet strip is greater than the corresponding width of the elongated door gasket magnet. The difference in width may correspond to the anticipated height tolerance (anticipated droop) of the door.

It will therefore be appreciated from the above summary that it would be an advantage to provide an appliance door sealing arrangement that incorporates a thermal break and can accommodate as many of the following requirements as possible:

able to operate over an increased door-to-cabinet space while providing a door gasket extension force that is between desired upper and lower limits, incorporates a magnet or magnets having cross-sectional areas that are able to fit in the confined space of the throat, allows for an amount of door-to-cabinet misalignment while maintaining adequate gasket extension force, and can be made using low-cost magnet material.

SUMMARY OF INVENTION

It is therefore an object of the present invention to provide a throat assembly for a refrigeration appliance or a refrigeration appliance that will go at least some way towards overcoming the above disadvantages or which will at least provide industry or the public with a useful choice.

In a first aspect the invention consists in a throat assembly for a refrigeration appliance comprising:

a member having at least one elongate plastics injection moulded component, the elongate component having a lateral width and a longitudinal extent, the at least one elongate component including an elongate panel having a front face with a planar region, the planar region of the front face separated, in a direction perpendicular to the planar region, from a rear face of the panel, and an elongate magnet arrangement in contact with or attached to the rear face of the panel.

In a second aspect, the invention may broadly be said to consist in a throat assembly for a refrigeration appliance comprising:

a member having at least one elongate component, the elongate component having a lateral width and a longitudinal extent, the elongate component including an elongate panel having a front face with a planar region, the planar region of the front face separated, in a direction perpendicular to the planar region, from a rear face of the panel by a panel thickness, and an elongate magnet arrangement in contact with or attached to the rear face of the panel and extending in the direction of the longitudinal extent of the elongate component, the elongate magnet arrangement having two laterally spaced-apart magnet elements, wherein the poles of the magnet elements are arranged so that the magnets experience a repulsion force therebetween.

In a third aspect, the invention may broadly be said to consist in a refrigeration appliance including the throat assembly according to the first or second aspect.

The invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only. In particular, the invention is mainly described with reference to its implementation in a refrigeration appliance, however one of ordinary skill in the art will appreciate that at least some aspects of the present invention are equally suitable for incorporation in other devices which generally include a door attached to a cabinet such as by a hinge or hinges, wherein it is necessary or beneficial to provide some closing and/or retention force between door and cabinet. "Refrigeration appliance" as used herein includes free-standing or built-in refrigerators, freezers and combined refrigerator-freezers, chest freezers, refrigeration drawers (such as our own COOLDRAWER™ multi-temperature cooling drawer) and wine cabinets. Although the foregoing and the following description refers to "door" sealing arrangements, in the case of cooling drawers it will be appreciated that the "door" in such a refrigeration appliance is not a conventional hinged door leaf but instead is formed by a front panel of the drawer, the inside-facing periphery of which provides a flange for mounting the magnetic door gasket referred to herein which seals against a periphery of a front face of the cabinet.

BRIEF DESCRIPTION OF DRAWINGS

Preferred embodiments of the invention will be described by way of example only and with reference to the accompanying drawings, in which.

DESCRIPTION OF EMBODIMENTS

Figure 1:
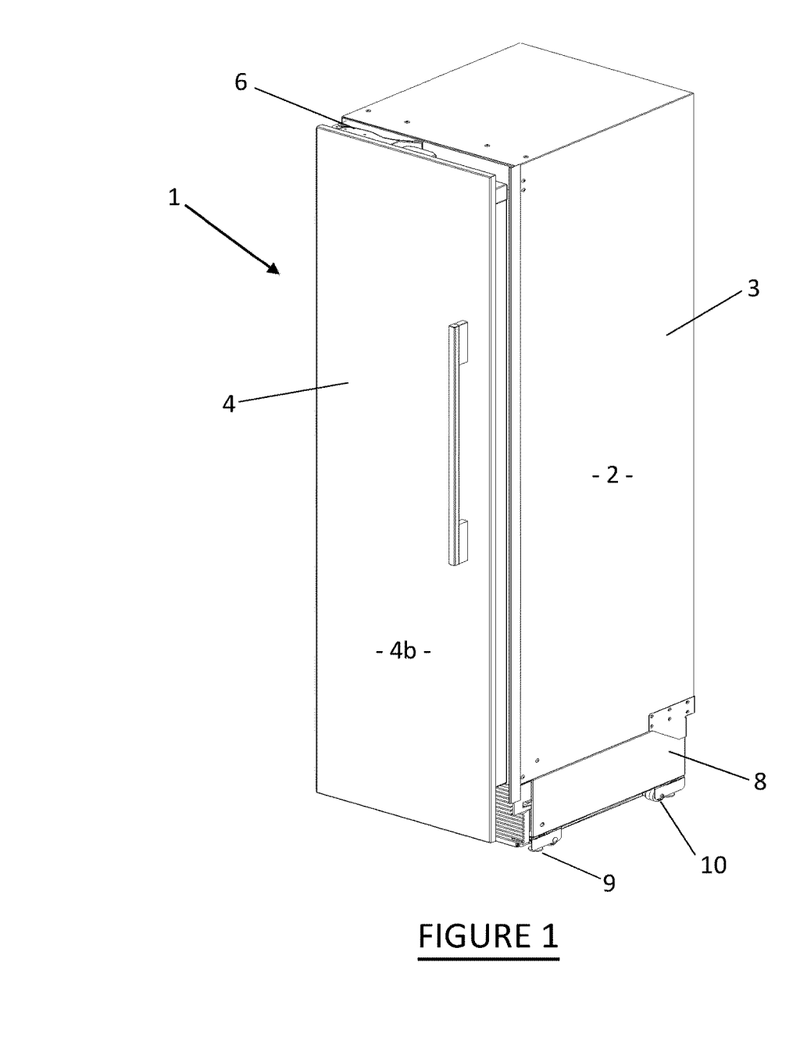
FIG. 1 is a perspective view from the front and side of a refrigeration appliance incorporating a door-sealing arrangement according the present invention with the door closed.
Figure 2:
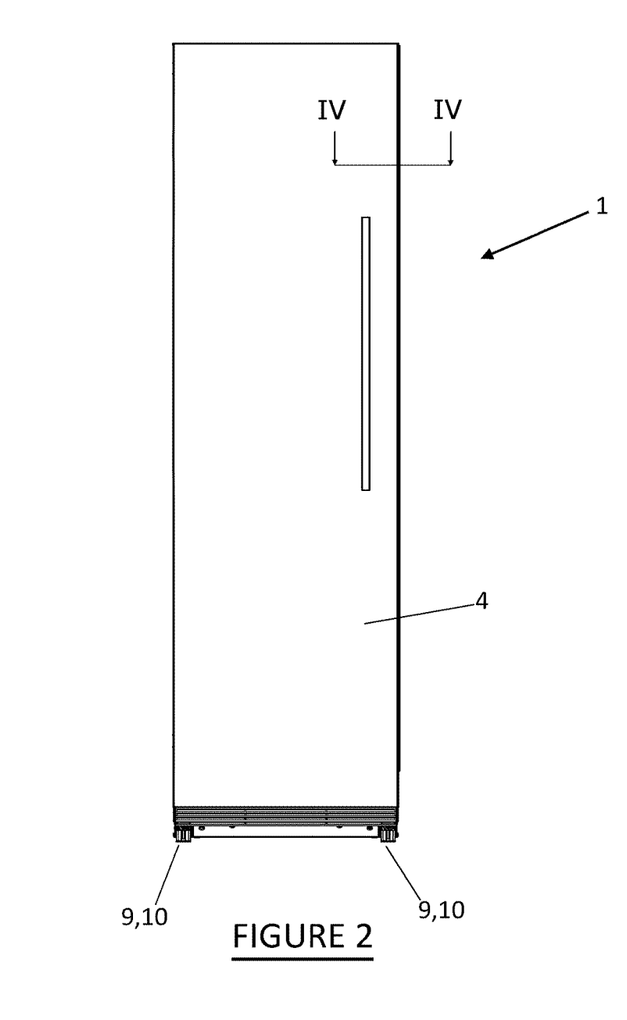
FIG. 2 is a front view of the refrigeration appliance of FIG. 1.
Figure 3:
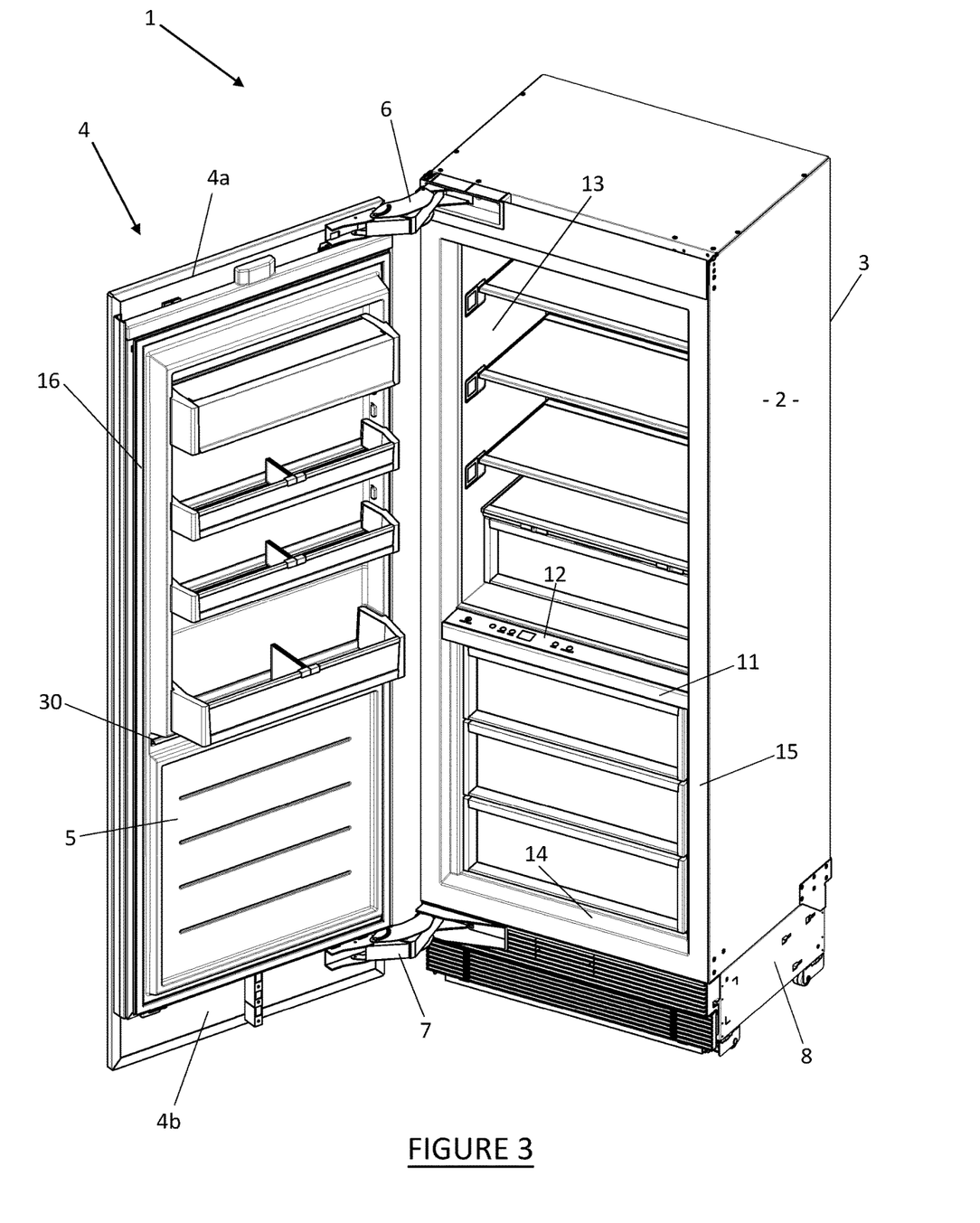
FIG. 3 is a perspective view of the refrigeration appliance of FIGS. 1 and 2 from the front and side with the door open.

With reference to the accompanying drawings and in particular FIGS. 1 to 3 initially, a refrigeration device or appliance 1 is shown. Refrigeration appliance 1 in the illustrated embodiment may be a "vertical" refrigerator or freezer or combination refrigerator/freezer having a height of about 84 inches (about 213 cm). The refrigeration appliance has an outer shell or wrapper 2 formed of sheet steel folded and crimped, riveted or welded to form an open-sided rectangular prism-shaped cabinet 3 having bottom, top, rear and two opposing side panels. A door 4 is operatively attached to the cabinet to selectively close the open side. Door 4 may include (as in the illustrated embodiment), a sheet steel hinged door leaf 4a as well as an outer door skin 4b attached to the outer major face of the hinged door leaf, which is preferably substantially planar.

As is well known, the hinged door leaf may have a moulded plastics liner 5 forming the door's inner surface and which is fixed to a folded sheet steel door shell forming the door's outer major face, the space between the two being filled with thermally insulating foam. The door liner 5 may be moulded to include shelves or may have features moulded therein to enable shelves and compartments to be attached thereto. The outer door skin 4b may be a removable panel (such as wood or stainless steel) adjustably attached to the hinged door leaf 4a to match the appearance of surrounding cabinetry in the installation location such that the appliance is then described as "built-in". The door 4 could alternatively be conventional with a stainless or painted steel exterior surface and no outer door skin 4b. Upper 6 and lower 7 hinges connect the door to the cabinet. Given that the door is very tall and has a significant weight, hinges 6, 7 are substantial and in the illustrated embodiment are articulated (so that the door translates outwardly, away from the cabinet as it also rotates open) to allow the door to have an extended opening angle range despite its outer skin 4b, in use, being flush with surrounding cabinetry with minimally-sized gaps therebetween.

Cabinet 3 also accommodates a refrigeration system (not shown) and in the illustrated embodiment the refrigeration system is housed at the base of the cabinet in a compressor compartment 8 which may also be referred to as a plinth upon which the refrigeration compartments sit to improve user access to the lower region of the cabinet.

As is well-known, the refrigeration system transfers heat from within the cooling compartment(s) to the appliance's external environment. The refrigeration system may be a closed refrigerant-charge-containing circuit including at least a compressor, a condenser, an expansion/restriction device (such as a capillary tube or throttling valve) and at least one evaporator. The evaporator, or each evaporator (in the case of plural evaporators, each of which may be operated at different temperatures) is/are positioned so as to cool one or more compartments within the appliance and often one or more fan and associated ducting is provided within the cabinet to distribute cold air within the compartment(s) and over the evaporator(s).

The bottom of cabinet 3 (or the plinth) is provided with feet 9 and/or wheels 10 to enable the appliance to be easily moved during installation or servicing. Cabinet 3 surrounds at least one cooling compartment. As evident from FIG. 3, the cabinet of the illustrated embodiment has an upper compartment and a lower compartment separated by a divider or mullion bar 11. The refrigeration system and fans may be operated by an appliance controller (not shown) which executes software so as to substantially maintain the compartments at or near pre-set fixed temperatures (such as a refrigerator temperature and a freezer temperature) or at/near fixed temperatures set by a user, with temperature feedback provided by one or more temperature sensor(s) within the compartment(s). The mullion bar may conveniently accommodate a user interface 12 of control buttons and display items on a surface thereof to enable a user to input desired compartment temperatures and to provide the user with feedback on such things as current compartment temperatures. A door-facing surface of the mullion bar seals against a feature of the door inner liner when the door is closed to maintain compartment temperature independence.

Located within cabinet 3, and forming the five major inner surfaces (top, bottom, rear and two opposed sides) of the compartment(s) is a compartment liner 13 that may either be formed of plastics material such as ABS or, as in the illustrated embodiment, formed from folded sheet metal such as pre-painted or stainless sheet steel. Each compartment liner has an open side to allow access to the compartment. The compartment liner 12 may be a one-piece liner forming the inner surfaces of both the upper and lower compartments or separate liners may be provided for each compartment. The compartment liner or liners are within but spaced away from the inner surface of the cabinet wrapper 2 and a thermal breaker or throat assembly 14 is attached to and spans between the peripheries of the open faces of the cabinet 3 and compartment(s). A single large compartment liner filling substantially the entire cabinet could alternatively be provided with a planar divider component positioned parallel to the top and bottom compartment surfaces and being fixed at a desired vertical location to separate the compartment into two. The throat assembly could include a structure to support the front edge of the divider which may include or connect with the mullion bar 11.

As previously mentioned, the throat assembly 14 provides a thermal break between the two components (outer wrapper and inner liner(s)) and so is formed from a poorly heat-conducting material such as plastics. The throat assembly may be formed as a frame (similar in shape to a picture frame) between the two peripheries and provides a substantially planar door-facing flange 15. In the case of multiple compartments between cabinet 3, one or more mullion bars 11 may be provided which may be separable from the throat assembly rather than a part thereof, such that the throat assembly may only be substantially rectangular in shape when viewed from in front of the cabinet, having two longer vertical limbs connected by shorter, horizontal upper and lower limbs. Each of the limbs may be referred to herein as an elongate element of the throat assembly and may be formed (such as injection moulded or extruded) separately and subsequently assembled to form the aforementioned frame.

Alternatively, in its preferred form, the elongate elements of the throat assembly may be formed together in a single monolithic or integrated component such as by a plastics injection moulding process (that is, the throat assembly may be injection moulded in a single mould). Preferably, a single component injection-moulded throat assembly, for use in a multi-compartment cabinet (such as the one illustrated), includes a third, shorter horizontal limb or elongate element for accommodating the user interface 12 and supporting the mullion bar 11 thereon, part way between the upper and lower horizontal limbs (though not necessarily flush with the front flange 15) so that the throat assembly resembles a figure "8" when viewed from the front. As may be seen in FIG. 3, the longer, vertical elongate elements of the throat assembly extend substantially the entire height of the cabinet 3, apart from a short vertical extent at the top of the cabinet and that it does not extend below the cabinet to plinth 8. The longer elongate elements may therefore be longer than about 1.5 m, perhaps as long as about 1.8 m, which is a significant length for molten plastics to flow in a plastics injection moulding tool.

In the illustrated embodiment, throat assembly 14 has a "U"-shaped profile in cross-section, the open side of which extends rearwardly (toward the rear of the appliance) from front flange 15 a short distance (between about 3 cm and about 7 cm) before the inner leg of the profile meets the compartment liner. In the embodiment shown in FIG. 3 front flange 15 is flush with the peripheral front-facing edge of the cabinet wrapper 2 so that the outer leg of the throat assembly profile is entirely overlapped by the wrapper and not visible in FIG. 3. Once the compartment liner(s) 13, cabinet 3 and throat assembly 14 are arranged and fixed together, the void between the cabinet and liner(s) is filled with a thermally-insulating foam that, when cured, bonds to all components and provides some structural rigidity to the cabinet. As may also be seen in FIG. 3, the completed cabinet may be provided with accessories such as shelves and/or drawers for holding items to be cooled and the liner(s) may be moulded to include mounting features for such accessories in their inner surface(s). Openings may also be provided in the liner(s) for lighting fixtures as visible in FIG. 3.

Throat Assembly

Figure 4:
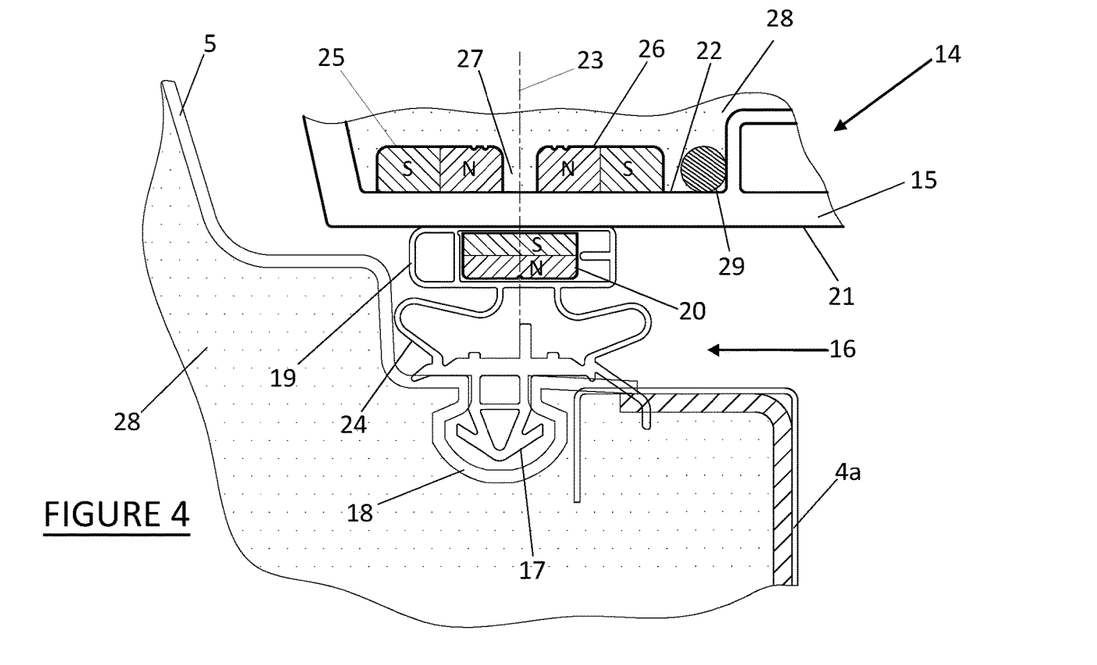
FIG. 4 is a cross-sectional view through line IV-IV of FIG. 2 showing a door sealing arrangement in accordance with a first embodiment of the present invention.

As may be best seen in FIGS. 3 and 4, the cabinet-facing side of door 4 is provided with a door gasket seal 16 attached to a substantially planar peripheral flange 15 of the door. Door gasket seal 16 is preferably formed (such as extruded) from a flexible plastics material as is well-known and forms a closed path about the door periphery. Gasket seal 16 may be made up of one continuous, closed length of gasket or one or more length of gasket seal may be used with free ends butted against one another. As seen in FIG. 4, the gasket has a profile including an extending lip 17 that locks within a track 18 formed about the periphery of door inner liner 5. Because the gasket seal is formed from a flexible material, lip 17 may be easily inserted and removed from track 18 to allow for gasket replacement if necessary.

Gasket seal 16 includes a central, bellows section 24 connecting lip 17 to a magnet-containing engagement section 19. The bellows section 24 is able to change shape to enable the gasket seal to adapt to different distances between the door and cabinet. A door magnet element 20 is accommodated within a closed volume of the engagement section 19. In the preferred form, door magnet 20 is a two-pole magnet element with poles arranged on opposite sides of the element, a magnetic axis 23 between the poles being substantially perpendicular to the front face of cabinet 13 (when the door is in a closed position).

As is well-known, door magnet element 20 is preferably an elongate or "strip" magnet and is preferably a flexible permanent magnet. Elongate flexible permanent magnets are preferably formed from a ferrite powder combined with a plastics carrier such as a rubber polymer resin extruded to provide the desired cross-sectional shape. The resulting magnet strip is malleable so that it can be easily bent to encircle the opening of the door. Such ferrite-based permanent magnets are not as powerful as rare earth or "exotic" magnets but they have a much lower cost. For example, the door magnets may have Coercive Magnetic Field Strength (Hc) of between about 90 and about 120 kA/m (preferably about 100 kA/m), a Residual Flux density (Br) of between about 0.1 and 0.2 T (preferably about 0.13 T) and a relative permeability ($\mu_r$) of between about 1.03 and 1.2 (preferably about 1.05). The magnets in the throat assembly may have a rectangular-shaped cross-section with a width (parallel to the front face of cabinet 13 when the door is closed) of about 10 mm or 11 mm and a height (perpendicular to the front face of the cabinet) of about 4 mm or 5 mm. Suitable flexible permanent magnets are manufactured by Dexing Magnet Tech Co., Ltd of Xiamen, China and Rehau AG+Co. of Muri, Switzerland.

Accordingly, in the embodiment shown in FIG. 4, magnetic field lines emanate from one of the longer faces of the magnet element 20 (the faces parallel to the front face of the cabinet when the door is closed) and re-enter the magnet at the opposite longer face. In FIG. 4 the door magnet's south pole is cabinet-facing, or adjacent to throat assembly 14.

Figure 6:
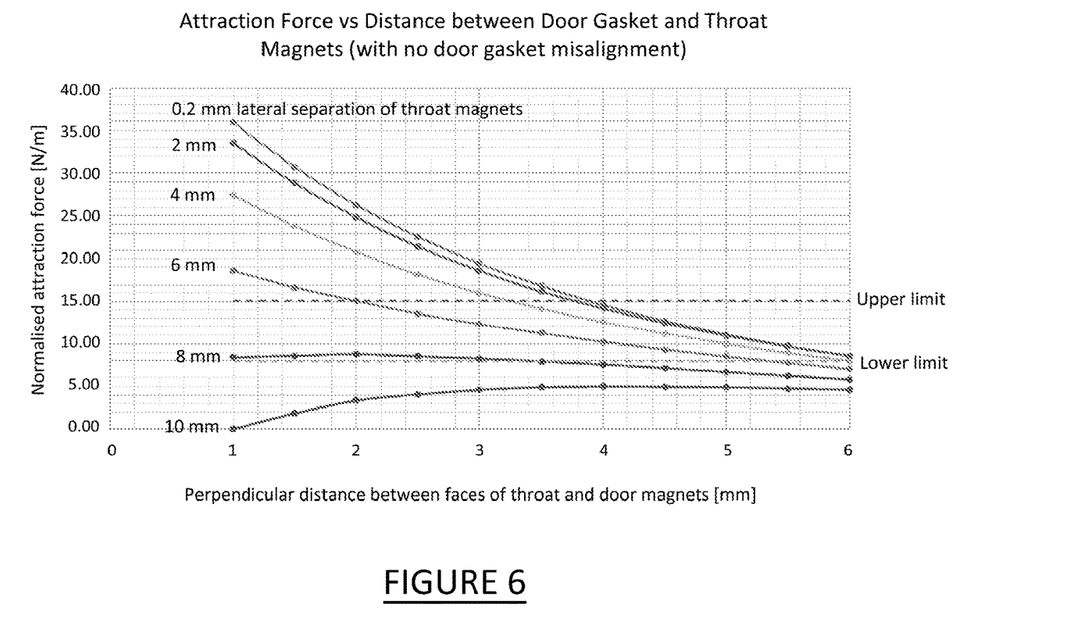
FIG. 6 is a graph illustrating the variation of normalised attraction force versus throat panel thickness for the door sealing arrangement of FIG. 4.

The throat assembly 14, as may be seen in FIGS. 4 and 6, includes door-facing flange 15 which effectively comprises a panel, the panel having a front face 21 including a planar region, the planar region separated by the thickness of the panel from a rear face 22. The thickness of the panel may be, for example, between about 2.0 mm and about 4.0 mm, most preferably about 3 mm. As previously, mentioned, preferably the throat assembly is formed in a plastics injection moulding process so that the panel is a solid plastics, such as ABS, member made up of at least four connected elongate members. Engagement section 19 of door gasket 16 forms a substantially air-tight seal against the substantially planar region of flange 15 when the door is in a closed position. The substantially air-tight seal is provided by a magnetic force exerted on the door magnet element 20 by a magnet arrangement within the throat assembly 14, directed towards flange 15.

The throat assembly magnet arrangement of FIG. 4 includes a first 25 and a second 26 magnet element. As with the door gasket magnet element 20, throat assembly magnet elements 25, 26 are preferably elongate ferrite-based flexible permanent magnets that are attached to the rear face 22 of flange 15, about the periphery of the cabinet opening, complementary to the location of the door gasket magnet element when the door is in a closed position. That is, on the vertical, or longer, sides of the throat assembly and door gasket the longitudinal length of the elongate magnet elements of the throat assembly and door gasket is arranged substantially vertically with some lateral (horizontal) overlap therebetween when viewed from in front (or behind) the cabinet. Similarly, on the horizontal, or shorter, sides of the throat assembly and door gasket the longitudinal length of the elongate magnet elements of the throat assembly and door gasket is arranged substantially horizontally with some lateral (vertical) overlap therebetween when viewed from in front (or behind) the cabinet. Note that it is not necessary to include magnet elements in any central (compartment-dividing) horizontal legs of the throat assembly or a corresponding magnet element across the width of the door as avoiding cooled air flow between compartments may be easily achieved by simply compressing a seal 30 provided on the door inner liner 5 against the mullion bar 11.

The elongate magnet elements of the throat assembly 14 magnet arrangement may have the same or a similar cross-sectional shape, dimensions and magnetic strength to the magnet element of the door gasket. For example, each of magnet elements 20, 25 and 26 may have a rectangular-shaped cross-section with a width (parallel to the flange 15 of cabinet 13 when the door is closed) of about 10 mm and a height (in the direction of magnetic axis 23, perpendicular to the flange 15) of about 4 mm. These dimensions are not critical to the operation of the present door sealing arrangement and other, readily available similarly sized magnets may be used such as elongate magnets having cross-section dimensions of 11 mm width and 4 mm height. In fact, it may be advantageous for the throat magnets 25, 26 to be slightly laterally wider than the lateral width of the door gasket magnet element 20 to reduce door-to-cabinet misalignment sensitivity.

Each magnet 25, 26 is attached to rear face 22 during assembly of the appliance and may be held in location prior to foaming of the cabinet by an adhesive or a double-sided tape and post-foaming, foam 28 retains the magnet elements in position. Magnet elements 25, 26 are applied to the rear face 22 in parallel, laterally spaced by a gap 27, and are magnetised to have two opposite poles at respective sides of each magnet element. The already confined lateral space available for magnets 25, 26 within the throat assembly may be further limited by the inclusion of a throat assembly heating tube 29 which is connected to the refrigeration system so as to channel heated refrigerant such that moisture does not condense on the front flange 15 of the throat assembly.

The width of gap 27 between throat assembly magnets 25, 26 may be between about 2 mm and about 5 mm, most preferably about 3 mm. It will be appreciated that, in contrast to door gasket magnet element 20, a magnetic axis between the opposed magnetic poles of each magnet element 25, 26 is aligned in parallel to the front face 21 of flange 15. That is, the magnetic axes of magnet elements 25, 26 are substantially perpendicular to magnetic axis 23 of the door gasket magnet element 20. Furthermore, it will be appreciated from FIG. 4 that the magnetic poles of magnet elements 25, 26 that are adjacent to gap 27 are of the same polarity. That is, in FIG. 4, the north pole of element 25 is nearest to gap 27 (and magnet element 26) and the north pole of magnet element 26 is nearest to gap 27 (and magnet element 25). In other words, the pole arrangement or polarity of magnet elements 25, 26 has reflectional symmetry about the centre of gap 27. Accordingly, magnet elements 25 and 26 mutually repel one another so that each exerts a repulsion force in the plane of their magnetic axes on the other and these repulsion forces must be managed during assembly of the throat assembly. As mentioned above, a double-sided tape having a sufficient bonding strength will enable magnet elements 25, 26 to retain their desired positions until curing of foam 28 at which time, the rigidity of the cured foam will easily nullify the repulsion forces.

Figure 5:
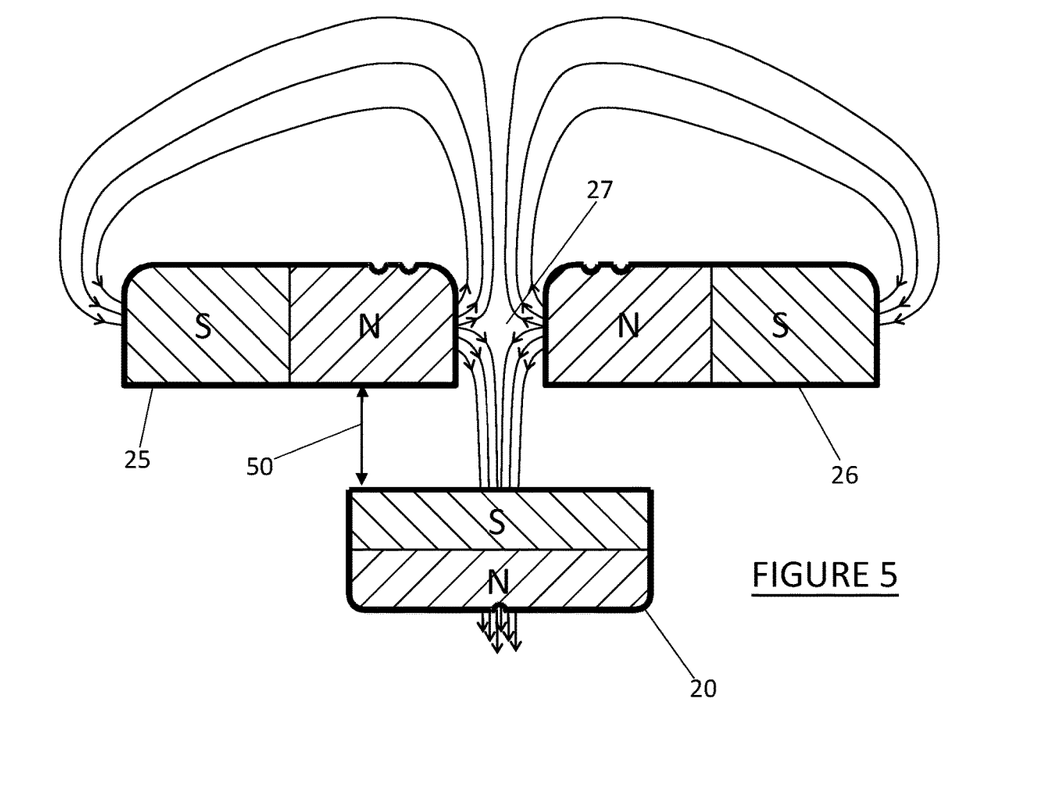
FIG. 5 is a magnet field diagram of the throat magnet arrangement of FIG. 4.

Accordingly, magnet elements 25, 26 may be viewed as similar in function to a three-pole magnet (see, for example, the aforementioned U.S. Pat. No. 6,464,312B), having a central north pole between spaced-apart south poles. To illustrate the effect of the magnetic sealing arrangement shown in FIG. 4, FIG. 5 shows an exemplary magnetic field diagram for magnet elements 20, 25 and 26 when the door is in its normal, closed position. It will be appreciated that the opposing north poles of magnet elements 25, 26 deform the magnetic field lines exiting the north poles by compressing them into a smaller space and by causing them to extend further away from the magnetic axes of elements 25, 26 in the vicinity of gap 27. As a result, the magnetic flux density at a distance from gap 27, in a plane perpendicular to the magnetic axis through the aligned poles of the magnet elements 25, 26, is greater than would be the case if one of the magnet elements was removed. So the effect of magnet elements 25, 26, perpendicular to their magnetic axes, is extended so that an acceptable door gasket extension force may be experienced over an increased flange 15 panel thickness 50. In contrast to a conventional three-pole magnet, this arrangement utilises less magnetic material and has stronger end fields.

It will be appreciated that because the lateral width of the throat assembly magnet arrangement (magnet elements 25, 26) is much greater than the lateral width of door gasket magnet element 20, the illustrated door sealing arrangement is relatively insensitive to lateral misalignment between the door gasket magnet element and the lateral centre of throat magnet elements 25, 26. That is, the described magnetic sealing arrangement of door gasket magnet and throat assembly magnets provides some inherent allowance for magnet misalignment, which may occur over time due to door overloading and hinge wear, while still ensuring that the attraction force exerted by the door gasket magnet against flange 25 is within an acceptable range.

FIG. 6 is a graph illustrating exemplary door to throat assembly attraction force versus panel thickness (50 in FIG. 5) for the magnet arrangement shown in FIGS. 4 and 5 at various different lateral gap (27) widths. An exemplary acceptable range of door gasket extension forces is indicated by dotted lines in the graph as being between about 8 N/m (that is, about 8 N of door gasket force over 1 m of door gasket and throat assembly) to about 14 N/m. This range of forces may be considered strong enough to ensure that the door does not remain slightly ajar and does not open accidentally or as a result of a knock while allowing the elderly or children to open the door without difficulty. As an example, when the ABS thickness of the panel-forming flange 15 is 3.0 mm, the actual distance (in the direction perpendicular to the planar region of flange 15) between door and throat magnet element faces may be about 3.5 mm. This is because an adhesive tape between rear surface 22 and magnets 25, 26 may be about 0.1 mm while the thickness of the door gasket in between the south pole of magnet element 20 and front face 21 of flange 15 (when the door is closed) may be about 0.4 mm. Accordingly, it will be apparent from FIG. 6 that an acceptable attraction force over a perpendicular distance (50—see FIG. 5) of 3.5 mm can be obtained using the aforementioned magnets with a gap 27 of between about 3 mm and about 8 mm. As the 3 mm gap provides an attraction force near the upper end of the allowable range, it is preferred. It has also been confirmed that such as arrangement can tolerate a lateral misalignment of up to approximately ±4 mm (that is, in FIG. 4 or FIG. 7 door magnet element 20 may move laterally so that its magnetic axis 23 is displaced to the left or right by up to about 4 mm either way). In experiments it has been confirmed that the previously-described arrangement, including two 11 mm×4 mm throat assembly magnets 25, 26, and a single 10 mm×4 mm door gasket magnet provides a substantially constant gasket extension force over a lateral misalignment of approximately ±4.25 mm.

Figure 7:
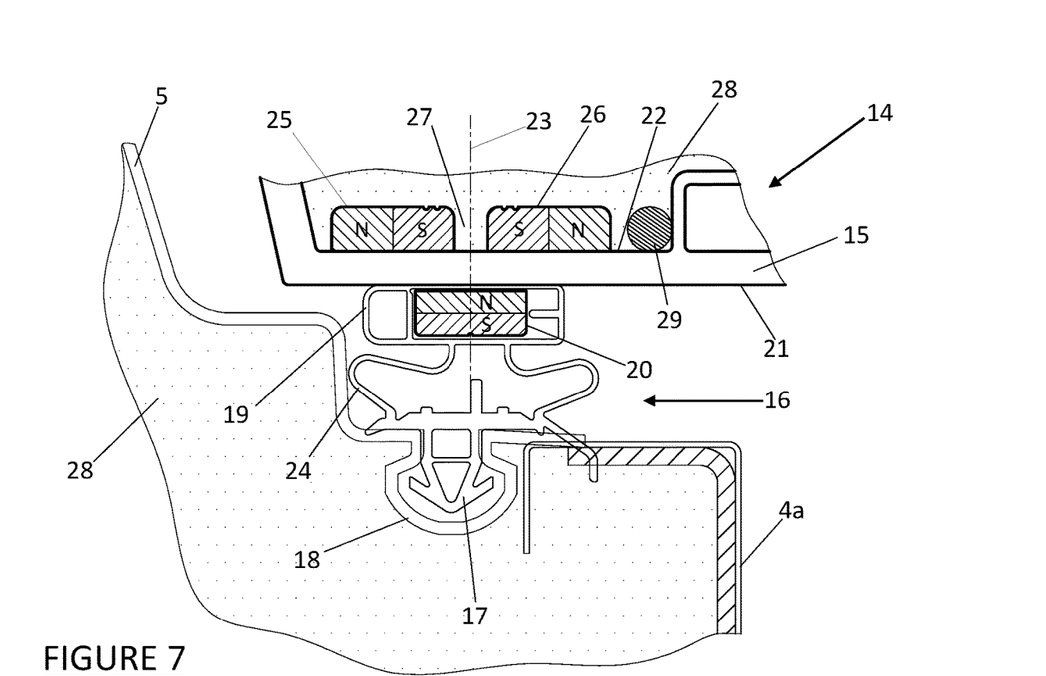
FIG. 7 is a cross-sectional view similar to FIG. 4 but showing a door sealing arrangement in accordance with a second embodiment of the present invention.

FIG. 7 is a second embodiment of the sealing arrangement detailed above in relation to FIGS. 4 and 5. The embodiment of FIG. 7 is substantially the same as the first embodiment except that the polarity of each magnet element is reversed. Accordingly, door gasket magnet element 20 now has its north pole facing the cabinet while magnet elements 25, 26 still exert repulsion forces against each other but this is now due to adjacent south poles on either side of gap 27. The operation of the magnetic sealing arrangement of FIG. 7 and the advantages provided therefrom are therefore the same as those described above with reference to FIGS. 4 and 5. It will be appreciated that the cross-sectional views of FIGS. 4 and 7 are taken in a horizontal plane so that the door and throat magnets are attracting across a vertical, or longer, leg section (or "elongate element") of the throat assembly frame. However, the same arrangement exists in the upper and lower, shorter or horizontal legs of the throat assembly frame.

In the above description, reference to elongate magnet elements encompasses unitary magnet elements manufactured in a single continuous length but should be understood to also encompass effectively continuous elongate magnet elements made by combining unitary shorter lengths of magnet element end-to-end or even separated by a short distance in the longitudinal direction.

It will be appreciated from the above description that the magnetic sealing arrangement, of which the above-explained throat assembly arrangement is a major component, provides an improved refrigerating appliance with significant advantages. These advantages include the ability to plastics injection mould the relatively long throat assembly, thus providing an improved finish quality, while still ensuring that door attraction force and door misalignment tolerance are within acceptable limits, and without requiring any post-moulding processing (such as routing) to reduce the thickness of the throat assembly front panel to reduce the distance across which the magnet arrangement must act.

The invention claimed is:

1. A throat assembly for a refrigeration appliance comprising:
    a member having at least one elongate component, the elongate component having a lateral width and a longitudinal extent, the at least one elongate component including an elongate panel having a front face with a planar region, the planar region of the front face separated, in a direction perpendicular to the planar region, from a rear face of the panel, and
    an elongate magnet arrangement in contact with or attached to the rear face of the panel, the magnet arrangement including two elongate magnet elements, both in contact with or attached to the rear face of the panel and extending in parallel, in the direction of the longitudinal extent of the at least one elongate component, the elongate magnet elements having lateral sides spaced apart in a direction substantially parallel to the planar region, and each magnet element magnetised to have two laterally-spaced opposite poles with magnetic field lines entering or exiting the magnet element on its respective lateral sides.

2. The throat assembly as claimed in claim 1, wherein the longitudinal extent of the elongate component is at least 1.5 m.

3. The throat assembly as claimed in claim 1, wherein at least one of the elongate magnet elements comprises at least one elongate flexible ferrite-based magnet which extends substantially the entire longitudinal extent of the elongate component.

4. The throat assembly as claimed in claim 1, wherein the member includes plural, interconnected elongate components that together form a monolithic frame surrounding at least one opening.

5. The throat assembly as claimed in claim 1, wherein the panel is free of any post-forming magnet-arrangement-accommodating reduced thickness regions.

6. The throat assembly as claimed in claim 1, wherein the panel thickness between the front and rear faces is between about 2.0 mm and about 4.0 mm.

7. The throat assembly as claimed in claim 1, wherein the elongate magnet elements are separated laterally by a gap of between about 2.0 mm and about 5.0 mm.

8. A refrigeration appliance including the throat assembly as claimed in claim 1.

9. The refrigeration appliance as claimed in claim 8, further comprising:
    a cabinet body enclosing a cabinet space and having an open side surrounded by an opening periphery, the opening periphery including at least one longitudinal extent,
    a compartment within the cabinet body, the compartment provided by a liner nested within the cabinet body and having an open side accessible via the open side of the cabinet body, the compartment open side having a periphery with at least one longitudinal extent spaced apart from the at least one longitudinal extent of the cabinet body by an insulating gap, and
    a door operatively associated with the cabinet body to selectively close the compartment by covering the compartment's open side,
    wherein the elongate component of the member spans the insulating gap with its opposed lateral sides attached to the longitudinal extents of the cabinet and compartment peripheries, respectively, and
    wherein the door includes a magnetic seal aligned with the throat assembly elongate magnet arrangement when the door is in a closed position.

10. The refrigeration appliance as claimed in claim 9, wherein the magnetic seal comprises an elongate magnet element that is positioned so that in the closed position of the door, it is overlapped with the throat assembly elongate magnet arrangement, between the lateral extents of the throat assembly elongate magnet arrangement.

11. The refrigeration appliance as claimed in claim 10, wherein the elongate magnet element of the door magnetic seal has front and rear sides spaced apart in a direction substantially perpendicular to the planar region, and is magnetised to have two opposite poles with magnetic field lines entering the magnet element substantially perpendicularly to either one of its front or rear sides and exiting the magnet element substantially perpendicularly to the other one of its front or rear sides.

12. The refrigeration appliance as claimed in claim 9, wherein the throat assembly elongate magnet arrangement has a door-facing pole located between its lateral extents, with magnetic field lines entering or exiting the door-facing pole substantially perpendicularly to the front face of the panel.

13. The refrigeration appliance as claimed in claim 12, wherein the pole of the magnet element of the door magnetic seal nearest to the cabinet when the door is in its closed position is opposite in polarity to the door-facing pole of the throat assembly elongate magnet arrangement.

14. A throat assembly for a refrigeration appliance comprising:
    a member having at least one elongate plastics component, the elongate component having a lateral width and a longitudinal extent, the at least one elongate component including an elongate panel having a front face with a planar region, the planar region of the front face separated, in a direction perpendicular to the planar region, from a rear face of the panel, and
    an elongate magnet arrangement in contact with or attached to the rear face of the panel,
    wherein the magnet arrangement includes two elongate magnet elements, both having front faces in contact with or attached to the rear face of the panel and extending in parallel, in the direction of the longitudinal extent of the at least one elongate component,
    wherein the elongate magnet elements each have lateral sides and are each magnetised to have two laterally-spaced opposite poles with magnetic field lines entering and exiting the magnet elements on their respective lateral sides, and wherein each elongate magnet element has a proximal pole facing towards the other elongate magnet element, and wherein the proximal poles are of the same magnetic polarity.

15. A throat assembly for a refrigeration appliance comprising:

a member having at least one elongate component, the elongate component having a lateral width and a longitudinal extent, the elongate component including an elongate panel having a front face with a planar region, the planar region of the front face separated, in a direction perpendicular to the planar region, from a rear face of the panel by a panel thickness, and an elongate magnet arrangement in contact with or attached to the rear face of the panel and extending in the direction of the longitudinal extent of the elongate component, the elongate magnet arrangement having two laterally spaced-apart magnet elements, wherein the poles of the magnet elements are arranged so that the magnets experience a repulsion force therebetween.

16. The throat assembly as claimed in claim 15, wherein the magnet elements are separated laterally by a gap of between about 2.0 mm and about 5.0 mm.

17. The throat assembly as claimed in claim 15, wherein the magnet elements have lateral sides and are each magnetised to have two laterally-spaced opposite poles with magnetic field lines entering and exiting the magnet elements on their respective lateral sides.

18. The throat assembly as claimed in claim 17, wherein each magnet element has a proximal pole facing towards the other magnet element, and wherein the proximal poles are of the same magnetic polarity.

* * * * *